United States Patent
Binley

(10) Patent No.: US 9,066,530 B2
(45) Date of Patent: Jun. 30, 2015

(54) PROCESS AND APPARATUS FOR MANUFACTURING FROZEN AERATED CONFECTIONS

(75) Inventor: Gary Norman Binley, Shanghai (CN)

(73) Assignee: Conopco, Inc., Englewood Cliffs, NJ (US)

( * ) Notice: Subject to any disclaimer, the term of this patent is extended or adjusted under 35 U.S.C. 154(b) by 823 days.

(21) Appl. No.: 12/997,883

(22) PCT Filed: Jun. 3, 2009

(86) PCT No.: PCT/EP2009/056823
§ 371 (c)(1),
(2), (4) Date: Dec. 14, 2010

(87) PCT Pub. No.: WO2010/003739
PCT Pub. Date: Jan. 14, 2010

(65) Prior Publication Data
US 2011/0091622 A1    Apr. 21, 2011

(30) Foreign Application Priority Data
Jun. 16, 2008    (EP) ..................................... 08158343

(51) Int. Cl.
*A23G 9/46* (2006.01)
*A23G 9/22* (2006.01)
(Continued)

(52) U.S. Cl.
CPC .. *A23G 9/22* (2013.01); *A23G 9/04* (2013.01); *A23G 9/221* (2013.01); *A23G 9/28* (2013.01); *A23G 9/44* (2013.01)

(58) Field of Classification Search
CPC ......... A23G 9/222; A23G 9/221; A23G 9/22; A23G 9/28; A23G 9/44; A23G 9/04; B29C 33/026; B29C 39/126; B29C 41/26; B29C 43/08; B29C 48/06; A23C 3/11

USPC ........... 426/565, 660, 512, 515, 474; 425/116
See application file for complete search history.

(56) References Cited

U.S. PATENT DOCUMENTS 2,247,017 A * 6/1941 Henning ........................ 249/120
2,705,462 A    6/1953 Reinhard
(Continued)

FOREIGN PATENT DOCUMENTS

DE    3417196    11/1985
DE    3532071    3/1986
(Continued)

OTHER PUBLICATIONS

International Search Report PCT/EP2009/067823, pp. 1-2, Jan. 2010.
(Continued)

*Primary Examiner* — Jerry W Anderson
(74) *Attorney, Agent, or Firm* — Michael P. Aronson

(57) ABSTRACT

A process for manufacturing frozen aerated confectionery products is provided, the process comprising; providing two rollers wherein each roller has a multiplicity of open cavities on its surface and wherein the rollers are aligned so that the surfaces touch; providing filling means for filling said cavities with a frozen aerated confection at a temperature higher than the temperature of the rollers; filling two cavities, one on each roller, with a frozen aerated confection having an overrun of between 10% and 130%; allowing the frozen aerated confection to expand outside its cavity; and counter-rotating the rollers so that respective cavities in the two rollers lie opposite one another and the frozen aerated confection in a cavity of the first roller is pressed against the frozen aerated confection in an opposite cavity of the second roller; characterized in that the surfaces of the rollers in which the cavities are located are conical. An apparatus for operating the process is also provided.

4 Claims, 1 Drawing Sheet

(51) Int. Cl.
*A23G 9/04* (2006.01)
*A23G 9/28* (2006.01)
*A23G 9/44* (2006.01)

(56) References Cited

U.S. PATENT DOCUMENTS

| | | | |
|---|---|---|---|
| 4,375,349 | A | 3/1983 | Vrbanek |
| 4,612,852 | A | 9/1986 | Price et al. |
| 4,828,854 | A | 5/1989 | Beer |
| 5,493,957 | A | 2/1996 | Kennedy et al. |
| 5,667,824 | A | 9/1997 | Ream et al. |
| 5,902,621 | A | 5/1999 | Beckett et al. |
| 5,948,456 | A | 9/1999 | Jones et al. |
| 6,025,003 | A | 2/2000 | Jadraque et al. |
| 6,216,472 | B1 | 4/2001 | Cathenaut et al. |
| 6,251,454 | B1 | 6/2001 | Layfield |
| 6,270,826 | B1 | 8/2001 | Kashulines, Jr. et al. |
| 6,565,902 | B2 | 5/2003 | Ruano Del Campo et al. |
| 6,613,374 | B1 | 9/2003 | Fayard et al. |
| 2008/0038418 | A1* | 2/2008 | Doehren ............ 426/272 |

FOREIGN PATENT DOCUMENTS

| | | |
|---|---|---|
| EA | 0582327 | 9/1999 |
| EP | 0923875 | 6/1999 |
| EP | 1000551 | 5/2000 |
| EP | 1886580 A1 | 7/2007 |
| GB | 2378152 | 5/2003 |
| JP | 53140282 | 7/1978 |
| JP | 5843748 | 3/1983 |
| JP | 5843748 | 7/1983 |
| JP | 62087056 | 4/1987 |
| JP | 62091148 | 4/1987 |
| JP | 01030541 | 2/1989 |
| JP | 2000279095 | 10/2000 |
| JP | 2000279096 | 10/2000 |
| WO | WO9006693 | 6/1990 |
| WO | WO9410855 | 5/1994 |
| WO | 94/19972 | 9/1994 |
| WO | WO9826911 | 6/1998 |
| WO | WO9965325 | 12/1999 |
| WO | 2004/017748 A2 | 3/2004 |

OTHER PUBLICATIONS

EP Search Report EP 08 15 8343, pp. 1-3, Dec. 2008.
"Ice Cream", 4$^{th}$ Edition, W.S. Arbuckle, Chapman & Hall 1986, pp. 297-312.
WikiAnswers, Answers.com, 2011 pp. 1-3,.
Arbuckle, Frozen Confectins, Novelties, Fancy Molded Ice Creams, and Specials, Ice Cream 4th ED, 1986, 297-312, Chapman & Hall.
Hui, Bulky Flavor Addition, Dairy Science and Technology Handbook, Jan. 1, 1993, 250-252, 1-3, John Wiley & Sons, US.
Co-Pending Appln.; U.S. Appl. No. 10/643,244, filed Aug. 18, 2003, entitled: Process for the Manufacturing of Frozen Aerated Products.

* cited by examiner

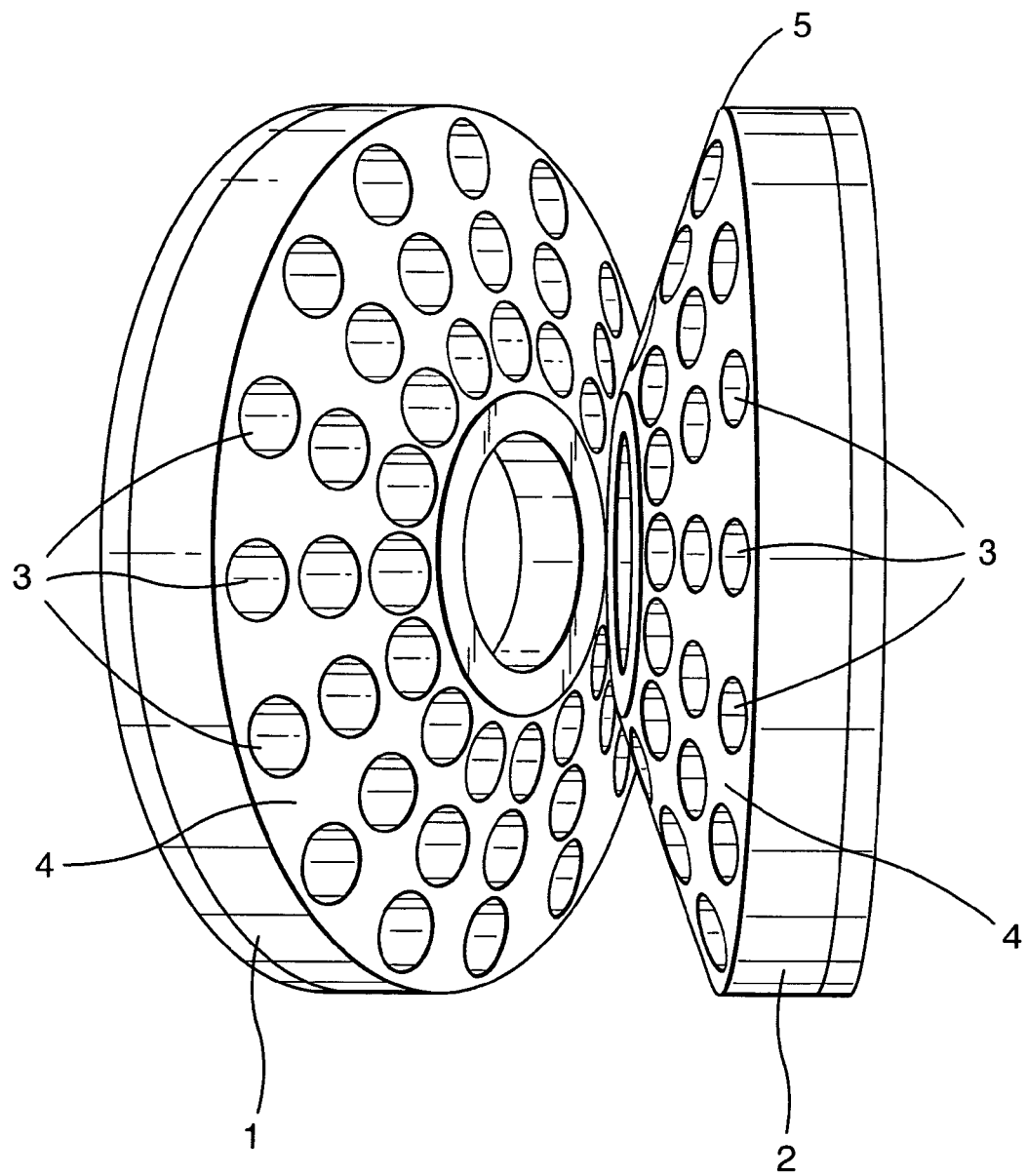

PROCESS AND APPARATUS FOR MANUFACTURING FROZEN AERATED CONFECTIONS

FIELD OF THE INVENTION

The present invention relates to a process and an apparatus for manufacturing frozen aerated confectionery products, such as ice cream. The present invention more particularly relates to the manufacturing of three dimensional shaped products.

BACKGROUND TO THE INVENTION

There is a demand for frozen confectionery products with interesting and distinctive shapes. Products that are shaped in two dimensions have been known for many years. They are usually produced by an "extrude and cut" process, in which partially frozen ice cream is extruded though a nozzle and cut by a wire into portions of uniform thickness. A stick may then be inserted and the ice cream can then be, for example, coated with chocolate and wrapped in individual packaging. The two dimensional shape arises from the shape of the nozzle, but there is no possibility of shaping in the third dimension using this process.

Three-dimensional shaped products can be produced by moulding. However, moulding processes have drawbacks, in particular the tendency of the ice cream to stick to the mould.

WO 04/17748 discloses an alternative process for the manufacturing of shaped ice cream products, the process comprising;
providing a pair of parallel cylindrical rollers, each having a multiplicity of open cavities on its surface,
filling two cavities, one on each roller, with ice cream,
allowing the ice cream to expand outside its cavity, and
counter-rotating the rollers so that the two cavities are moved opposite one another and the ice cream in each cavity is pressed against the ice cream in the other cavity.

This process presents many advantages. In particular, it allows the formation of complex shapes (true 3-dimensional products) at a high production rate. However, in order to minimise product defects and ensure that the two halves of the product stick together without a peripheral gap around the join, the radius of curvature of the rollers needs to be quite large relative to the size of the product. Large rollers are expensive to produce, take up lots of space in a factory and are heavy, so that it is inconvenient to change them (e.g. when changing product shapes). Thus there still remains a need for an improved method for producing shaped frozen confectionery products.

BRIEF DESCRIPTION OF THE INVENTION

We have now found that by using rollers in the form of truncated cones, rather than cylinders, three dimensional shaped products can be produced without requiring large rollers. Accordingly, in a first aspect the present invention provides a process for manufacturing frozen aerated confectionery products, the process comprising:
(a) providing two rollers wherein each roller has a multiplicity of open cavities on its surface and wherein the rollers are aligned so that the surfaces touch;
(b) providing filling means for filling said cavities with a frozen aerated confection at a temperature higher than the temperature of the rollers;
(c) filling two cavities, one on each roller, with a frozen aerated confection having an overrun of between 10% and 130%;
(d) allowing the frozen aerated confection to expand outside its cavity; and
(e) counter-rotating the rollers so that respective cavities in the two rollers lie opposite one another and the frozen aerated confection in a cavity of the first roller is pressed against the frozen aerated confection in an opposite cavity of the second roller;
characterised in that the surfaces of the rollers in which the cavities are located are conical.

Conical rollers provide several advantages over cylindrical ones. The effective radius of curvature of the rollers is increased, thereby reducing faults in the products caused by the curvature of the rollers. For example, a conical roller with an angle of 75° and a base diameter of 300 mm has an equivalent radius of 1200 mm. Since smaller rollers can be used, there are fewer cavities on each roller, so that the cost to machine each roller is reduced. Moreover, it is easier, quicker and safer to change rollers to produce a different product. Finally, the motion of the rollers also gives a more desired release action when demoulding complex shapes, because there is less interference between the mould cavity and product during release, due to the increased effective radius of curvature.

Preferably the angle of the cone (i.e. the angle between its axis and surface) is from 45° to 85°, more preferably from 70° to 80°.

Preferably, the rollers are at a temperature below −80° C., more preferably below −100° C., even more preferably below −130° C. if the rollers are made of stainless steel. The temperature is measured by an internal resistance temperature probe 5 mm beneath the surface. The rollers are preferably cooled with liquid nitrogen.

Preferably, the frozen aerated confection is at a temperature of between −3° C. and −20° C., preferably between −7° C. and −15° C., even more preferably between −9° C. and −13° C. when filled into the cavities.

In a second aspect, the present invention provides an apparatus for operating the process according to the invention, the apparatus comprising
two rollers, each having a multiplicity of open cavities on its surface;
filling means for filling said cavities with a frozen aerated confection; and
means for counter-rotating the pair of rollers so that respective cavities in the two rollers lie opposite one another and the frozen aerated confection in a cavity of a first roller is pressed against the frozen aerated confection in an opposite cavity of a second roller;
characterised in that the surfaces of the rollers in which the cavities are located are conical.

DETAILED DESCRIPTION OF THE INVENTION

Frozen aerated confections are described in "Ice Cream", 4$^{th}$ Edition, W S Arbuckle, Chapman & Hall 1986, pages 297 to 312. Frozen aerated confections are made by freezing a pasteurised mix of ingredients. The frozen aerated confection is preferably ice cream, sherbet, sorbet, frozen yoghurt, water ice or fruit ice. Ice cream typically contains (by weight) 2-18% fat, 6-12% non-fat milk solids (of which about one third is milk protein and about half is lactose), 12-18% sugars, together with other minor ingredients such as stabilisers, emulsifiers, colours and flavourings.

The term "aerated" means that the frozen confection has an overrun of at least 10%. Overrun is typically produced by intentionally incorporating gas into the confection, such as by mechanical agitation. The gas can be any food-grade gas such as air, nitrogen or carbon dioxide. Preferably, the overrun of the frozen aerated confection is above 50%, more preferably above 80%. The overrun preferably does not exceed 130%, and is more preferably less than 100%. Overrun is measured at atmospheric pressure and is defined by $$\text{overrun \%} = \frac{\text{density of mix} - \text{density of frozen aerated confection}}{\text{density of frozen aerated confection}} \times 100$$

The present invention will be further described with reference to the accompanying drawing wherein:

BRIEF DESCRIPTION OF THE DRAWINGS

FIG. 1 is a view of an apparatus according to the present invention.

As shown in FIG. 1, the apparatus comprises a pair of rollers 1 and 2 having mould cavities 3 defined on their outer conical surfaces 4. The two rollers are positioned and aligned to touch each other. By 'touching each other', it is meant a clearance of less than 0.1 mm. The angle between the axes of the rollers is twice the angle of the cone. By 'conical', it is meant that the surfaces of the rollers in which the cavities are located are the surface of a cone, typically a truncated cone. It is not necessary that the whole roller is conical. For example, the roller may be in the shape of a truncated cone (in the surface of which the cavities are located) adjacent to a cylinder having the same diameter as the base 5 of the truncated cone, as shown in FIG. 1.

The rollers can be made for example of aluminium or stainless steel and the surface can be treated with a coating to improve hardness (e.g. chromium coating). The rollers are refrigerated by circulating an appropriate refrigerating fluid, such as liquid nitrogen.

A first filling device (not shown) is provided for supplying frozen aerated confection into the mould cavities 3 of the first roller 1. A second filling device (not shown) is provided for supplying frozen aerated confection into the mould cavities 3 of the second roller 2. The first and second filling devices may be independent from one another, alternatively there may be one single filling device with two outputs, one for each roller. Each of the two filling devices advantageously comprises a manifold mounted in the close proximity to the roller cylindrical surface, with a clearance, in operation of below 1 mm.

Motor means (not shown) are arranged for counter-rotating the two rollers, to move the two surfaces towards one another and to press the frozen aerated confection in a cavity of the first roller against the frozen aerated confection situated in a cavity of the second roller.

The mould cavities shapes follow the normal rules for demouldability. Preferably, at the level of mould cavity opening, the mould cavity wall is not substantially vertical. It thus allows a better expansion of the frozen aerated confection and a better demouldability.

Although the two rollers can operate at a constant rotational speed, it has been found advantageous to operate at variable rotational speed. It has particularly been noticed that the filling of the cavities is greatly improved if a roller stops, or at least significantly slows down, while a cavity is filled. Therefore, the two rollers operate at a variable rotational speed. Preferably the rotational speed of a roller is at its minimal value when a filling device is over a cavity of this roller and at a maximal value when a filling device is between two cavities. More preferably, a roller is brought to stop when a filling device is over a cavity.

Preferably also, the rotational speed of both rollers is at a minimal value when two filled cavities face each other. In a most preferred embodiment, a minimal rotational speed of both rollers is reached when, at the same time, two filled cavities face each other and each filling device is over a cavity of each roller.

A stick may be placed between the two filled cavities after step (d) and before step (e). The frozen aerated product with a stick may stay in contact with one of the rollers after step (e). This allows for further heat exchange between the roller and the product, thus increasing the rigidity and hardness of the frozen aerated confection, and hence improving its handling in the following steps such as coating and wrapping.

The various features and embodiments of the present invention, referred to in individual sections above apply, as appropriate, to other sections, mutatis mutandis. Consequently features specified in one section may be combined with features specified in other sections, as appropriate. Although the invention has been described in connection with specific preferred embodiments, it should be understood that the invention as claimed should not be unduly limited to such specific embodiments. Indeed, various modifications of the described modes for carrying out the invention which are apparent to those skilled in the relevant fields are intended to be within the scope of the following claims.

The invention claimed is:

1. Process for manufacturing frozen aerated confectionery products, the process comprising;
    (a) providing two rollers wherein each roller has a multiplicity of open cavities located on a surface of a cone, said cone having an Angle of The Cone, defined as an angle between said surface and an axis of the cone, from 45° to 85°, wherein the rollers have axes that make an angle between them that is twice the Angle of The Cone, and wherein the rollers are aligned so that the surfaces touch;
    (b) filling two cavities, one on each roller, with a frozen aerated confection at a temperature higher than the temperature of the rollers having an overrun of between 10% and 130%;
    (c) allowing the frozen aerated confection to expand outside its cavity; and
    (d) counter-rotating the rollers so that respective cavities in the two rollers lie opposite one another and the frozen aerated confection in a cavity of the first roller is pressed against the frozen aerated confection in an opposite cavity of the second roller.

2. A process according to claim 1 wherein the angle of the cone is from 70° to 80°.

3. A process according to claim 1 wherein the rollers are at a temperature below −80° C.

4. A process according to claim 1 wherein the frozen aerated confection is at a temperature of between −3° C. and −20° C. when filled into the cavities.

* * * * *